US012339692B2

(12) United States Patent
Liu et al.

(10) Patent No.: US 12,339,692 B2
(45) Date of Patent: Jun. 24, 2025

(54) SYSTEMS AND METHODS FOR PHOTOVOLTAIC DIRECT CURRENT (DC) BUS CONTROL (71) Applicant: Nextracker LLC, Fremont, CA (US)

(72) Inventors: Yang Liu, Mountain View, CA (US); Alexander W. Au, Oakland, CA (US); Fei Gu, Fremont, CA (US)

(73) Assignee: NEXTRACKER LLC, Fremont, CA (US)

( * ) Notice: Subject to any disclaimer, the term of this patent is extended or adjusted under 35 U.S.C. 154(b) by 0 days.

(21) Appl. No.: 18/409,086

(22) Filed: Jan. 10, 2024

(65) Prior Publication Data

US 2024/0152169 A1 May 9, 2024

Related U.S. Application Data (63) Continuation of application No. 17/601,921, filed as application No. PCT/US2020/031303 on May 4, 2020, now Pat. No. 11,907,000.

(Continued)

(51) Int. Cl.
*G05F 1/67* (2006.01)
*H02J 3/38* (2006.01)
*H02J 7/35* (2006.01)

(52) U.S. Cl.
CPC ............... *G05F 1/67* (2013.01); *H02J 3/381* (2013.01); *H02J 7/35* (2013.01); *H02J 2207/20* (2020.01); *H02J 2300/26* (2020.01)

(58) Field of Classification Search
CPC ..... G05F 1/67; H02J 3/381; H02J 7/35; H02J 2207/20
See application file for complete search history.

(56) References Cited

U.S. PATENT DOCUMENTS 7,091,707 B2 8/2006 Cutler
7,479,774 B2 1/2009 Wai et al.
(Continued)

FOREIGN PATENT DOCUMENTS

CA 2865612 A1 3/2016
CN 105191045 A 12/2015
CN 107623488 A 1/2018

OTHER PUBLICATIONS

Jianfang Xiao et al: "Energy management system for control of hybrid AC/DC microgrids" 2015 IEEE 10th Conference On Industrial Electronics and Applications (ICIEA), IEEE, Jun. 15, 2015 (Jun. 15, 2015), pp. 778-783, XP032815926, DOI: 10.1109/ICIEA.2015.7334214 [retrieved on Nov. 20, 2015].

(Continued)

*Primary Examiner* — Adolf D Berhane
*Assistant Examiner* — Afework S Demisse
(74) *Attorney, Agent, or Firm* — Fredrikson & Byron, P.A.

(57) ABSTRACT

Solar power systems and methods utilize DC power transmission and centralized power inversion. The solar power systems include a photovoltaic (PV) bus system and a fixed bus system. The PV system utilizes a control mode handoff control method, which includes determining that a local maximum power point tracking (MPPT) control is enabled; in response to determining that the local MPPT control is enabled, starting an MPPT mode timer; performing local MPPT; determining that the MPPT mode timer is greater than a predetermined period; and, in response to determining that the MPPT mode timer is greater than a predetermined period, handing off MPPT control to the next MPPT controller. The distributed MPPT control method may include sequential MPPT control, adaptive ΔV MPPT control, and/or power limiting control. The fixed bus system includes PV (Continued)

string-level MPPT controllers and a fixed DC input central inverter or multiple fixed DC modular inverters.

20 Claims, 11 Drawing Sheets

Related U.S. Application Data (60) Provisional application No. 62/842,798, filed on May 3, 2019.

(56) References Cited

U.S. PATENT DOCUMENTS

| | | | |
|---|---|---|---|
| 7,969,133 B2 | 6/2011 | Zhang et al. | |
| 8,751,053 B2 | 6/2014 | Hadar et al. | |
| 10,122,178 B2 | 11/2018 | Sachs et al. | |
| 2006/0174939 A1 | 8/2006 | Matan | |
| 2007/0236187 A1 | 10/2007 | Wai et al. | |
| 2008/0238195 A1* | 10/2008 | Shaver | H10F 77/955 |
| | | | 307/18 |
| 2009/0079383 A1 | 3/2009 | Fornage et al. | |
| 2009/0284240 A1 | 11/2009 | Zhang et al. | |
| 2010/0156189 A1 | 6/2010 | Fishman | |
| 2012/0032665 A1* | 2/2012 | Shaver, II | H02J 3/38 |
| | | | 323/318 |
| 2012/0133207 A1 | 5/2012 | Frolov et al. | |
| 2012/0266938 A1 | 10/2012 | Goei et al. | |
| 2014/0183960 A1 | 7/2014 | Balachandreswaran et al. | |
| 2015/0318705 A1 | 11/2015 | Lucas et al. | |
| 2016/0297544 A1 | 10/2016 | Kim et al. | |
| 2020/0321776 A1 | 10/2020 | Shaver, II et al. | |

OTHER PUBLICATIONS

Baranwal Mayank et al: "A Distributed Architecture for Robust and Optimal Control of DC Microgrids", IEEE Transactions On Industrial Electronics, IEEE Service Center, Piscataway, NJ, USA, vol. 66, No. 4, Apr. 1, 2019 (Apr. 1, 2019), pp. 3082-3092, XPOII 703730, ISSN: 0278-0046, DOI: 10.1109/TIE.2018.2840506 [retrieved on Dec. 3, 2018].

Examination Report No. 1 issued in Australian Patent Application No. 2020268909 dated Oct. 11, 2022.

PCT Search Report and Written Opinion issued in PCT/US2020/031303 dated Sep. 18, 2020, 15 pages.

Extended European Search Report for corresponding EP patent application EP20802708.6, dated May 9, 2023, 18 pages.

Patsamatla Haritha et al: "Universal maximum power point tracking in wind-solar hybrid system for battery storage application" 2014 International Conference On Embedded Systems (ICES), IEEE, Jul. 3, 2014 (Jul. 3, 2014), pp. 194-199, XP032681211, DOI: 10.1109/EMBEDDEDSYS.2014.6953155 [retrieved on Nov. 11, 2014].

Hosseinipour Ali et al: "Virtual inertia control of PV systems for dynamic performance and damping enhancement of DC microgrids with constant power loads", IET Renewable Power Generation, The Institution of Engineering and Technology, Michael Faraday House, Six Hills Way, Stevenage, Herts. SG1 2AY, UK, vol. 12, No. 4, Mar. 19, 2018 (Mar. 19, 2018), pp. 430-438, XP006065883, ISSN: 1752-1416, DOI: 10.1049/IET-RPG.2017.0468.

* cited by examiner

SYSTEMS AND METHODS FOR PHOTOVOLTAIC DIRECT CURRENT (DC) BUS CONTROL

CROSS-REFERENCE TO RELATED APPLICATIONS

This application is a continuation of U.S. patent application Ser. No. 17/601,921, filed Oct. 6, 2021, which the benefit of U.S. Provisional Application No. 62/842,798, filed May 3, 2019, the entire contents of each of which are incorporated herein by reference.

FIELD

This disclosure is generally directed to solar power generating systems. More particularly, this disclosure is directed to solar power systems and methods utilizing DC power transmission and centralized power inversion.

BACKGROUND

Solar and wind energy are increasingly important renewable, non-polluting energy sources for consumers and businesses throughout the world. For solar energy, photovoltaic (PV) panels arranged in an array or string typically provide the means to convert solar energy into electrical energy. In operating PV arrays, maximum power point tracking (MPPT) is generally used to automatically determine a voltage or current at which the PV array should operate to generate a maximum power output for a particular temperature and solar irradiance. Although MPPT allows for the generation of maximum output power, the transmission and storage of the power generated by the PV arrays may be inefficient and costly.

SUMMARY

The techniques of this disclosure generally relate to PV bus and fixed DC bus power systems, and methods of controlling the PV bus and fixed DC power systems. Among other advantages, the techniques of this disclosure provide redundancy among a network of DC/DC controllers in case a subset of the DC/DC controllers fails or is unable to perform MPPT functions.

One general aspect includes a method for controlling a PV bus power system. The method includes determining, at a current DC/DC controller, that local maximum power point tracking (MPPT) control is enabled; in response to determining that local MPPT control is enabled, starting an MPPT mode timer; performing MPPT; determining that the MPPT mode timer is greater than a predetermined period; and, in response to determining that the MPPT mode timer is greater than a predetermined period, handing off MPPT control mode to the next DC/DC controller. Other aspects include corresponding computer systems, apparatus, and computer programs recorded on one or more computer storage devices, each configured to perform the actions of the methods.

Implementations may include one or more of the following features. The method may include determining that the local MPPT control is not enabled; and in response to determining that the local MPPT control is not enabled, holding the previous duty cycle at the current MPPT controller's last known MPPT setpoint. The method may include measuring local voltage and current; and determining maximum power point voltage seeking direction $\Delta V$ based on the measured local power perturbations. The method may include determining that a power limit is enabled; and in response to determining that the power limit is enabled, determining the output power based on the measured local voltage and current, and determining that the output power is greater than a power threshold; and in response to determining that the output power is greater than the power threshold, performing MPPT in the direction of negative $\Delta V$. The method may include determining that the output power is not greater than a power threshold; and, in response to determining that the output power is not greater than the power threshold, performing MPPT in the direction of positive $\Delta V$, also referred to herein as reverse MPPT.

The method may include determining that a power limit is not enabled; and, in response to determining that the power limit is not enabled, performing MPPT. The method may include determining that the MPPT mode timer is not greater than the predetermined period; in response to determining that the MPPT mode timer is not greater than the predetermined period, further determining that the MPPT control is enabled; and, in response to further determining that the MPPT control is enabled, starting the MPPT mode timer. The method may include determining that the MPPT mode timer is not greater than the predetermined period; in response to determining that the MPPT mode timer is not greater than the predetermined period, further determining that the MPPT control is not enabled; and, in response to further determining that the MPPT control is not enabled, further holding the previous duty cycle at the current MPPT controller's last known MPPT setpoint.

The method may include in response to determining that the MPPT mode timer is greater than a predetermined period, allowing a voltage perturbation for a distributed energy resource before handing off MPPT control mode to the next MPPT controller. The method may include scaling the magnitude of the voltage perturbation. The method may include scaling the magnitude of the voltage perturbation based on a local device metric. The local device metric may be an output power or a battery state of charge. Implementations of the described techniques may include hardware, a method or process, or computer software on a computer-accessible medium.

Another general aspect features a PV bus system. The PV bus system includes a central inverter unit, PV buses coupled to the central inverter unit, PV strings coupled to the central inverter unit via the PV buses, respectively, batteries coupled to the PV buses, respectively, and DC/DC controllers coupled between the batteries and the PV buses, respectively. Each of the DC/DC controllers includes a processor and a memory. The memory has stored thereon instructions, which, when executed by the processor, causes the DC/DC controller to determine that a maximum power point tracking (MPPT) control is enabled; in response to determining that the local MPPT control is enabled, start an MPPT mode timer; perform MPPT; determine that the MPPT mode timer is greater than a predetermined period; and in response to determining that the MPPT mode timer is greater than a predetermined period, hand off MPPT control mode to a next DC/DC controller.

Implementations of the PV bus system may include one or more of the following features. Each of the DC/DC controllers may include a MPPT controller and a DC/DC converter. Each of the DC/DC controllers may include a proportional-integral-derivative (PID) control stage and a droop stage coupled to the PID control stage. Each of the PV strings may include at least one PV panel. The instructions, when executed by the processor, may further cause the DC/DC controller to determine that the MPPT control is not enabled; and, in response to determining that the MPPT control is not enabled, hold the previous duty cycle at the current MPPT controller's last known MPPT setpoint. The instructions, when executed by the processor, may further cause the DC/DC controller to measure local voltage and current; determine MPPT ΔV based on the measured local voltage; determine that a power limit is enabled; and, in response to determining that the power limit is enabled, determine the output power based on the measured local voltage and current; and determine that the output power is greater than a power threshold; and, in response to determining that the output power is greater than the power threshold, perform MPPT. The instructions, when executed by the processor, may further cause the DC/DC controller to determine that the output power is not greater than a power threshold; and, in response to determining that the output power is not greater than the power threshold, perform reverse MPPT.

Still another general aspect features a fixed DC bus system. The fixed DC bus system includes modular inverters; a fixed DC bus coupled to the modular inverters; PV strings coupled to the modular inverters via the fixed DC bus; batteries coupled to the fixed DC bus; and DC/DC controllers coupled between the batteries and the fixed DC bus. Each PV string includes an MPPT controller. The MPPT controller includes a PID control stage and a droop stage having a droop gain.

Implementations of the fixed DC bus system may include one or more of the following features. The PID control stage may include a first voltage gain block and a first proportional-integral (PI) controller coupled to the output of the first voltage gain block. The droop stage may include a droop gain block that applies a droop gain to an input voltage to obtain a droop gain voltage, and a first subtraction block that is coupled to the output of the droop gain block and that subtracts the droop gain voltage from the output of the first PI controller to obtain an adjusted PI controller output. The droop stage may include an addition block that is coupled to the output of the first subtraction block and that adds the adjusted PI controller output to a reference power to obtain a further adjusted PI controller output. The droop stage may include a second subtraction block that is coupled to the addition block and that subtracts the input voltage from the further adjusted PI controller output. The droop stage may include a second voltage gain block that is coupled to the output of the second subtraction block, and a second PI controller that is coupled to the output of the second voltage gain block.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

Various aspects of the present disclosure are described herein below with reference to the drawings, which are incorporated in and constitute a part of this specification, wherein.

DETAILED DESCRIPTION

The fixed DC bus system architecture (e.g., the fixed DC bus system 300 illustrated in FIG. 3) of this disclosure includes a fixed DC bus that serves as a standardized power interconnection for photovoltaic (PV) generation and storage devices (e.g., PV arrays, batteries, controllers, drivers, alternating current (AC) systems, etc.). In aspects, common fixed bus systems may address some of the issues associated with PV- and battery-bus systems and accelerate the deployment and improve the cost savings of complete photovoltaic/energy storage systems.

To interface PV arrays to a fixed DC bus, distributed maximum power point tracking (MPPT) controllers at the string, sub-string, or module level are needed to maximize PV power generation. The increased cost of distributed MPPT controllers may be sufficiently offset by cost savings in wiring and improvements in total energy yield.

Central inverter PV bus systems (e.g., the PV bus system 100 illustrated in FIG. 1), in which a central inverter may drive the MPPT voltage of all PV strings connected to the central inverter, may mirror features inherent in fixed DC bus systems, including simultaneous MPPT tracking, power sharing, and power limiting, while operating with a variable voltage DC bus. This disclosure presents control techniques providing such features and performance comparisons between fixed DC bus systems and PV bus systems.

PV Bus Central Inverter Power Systems

Figure 1:
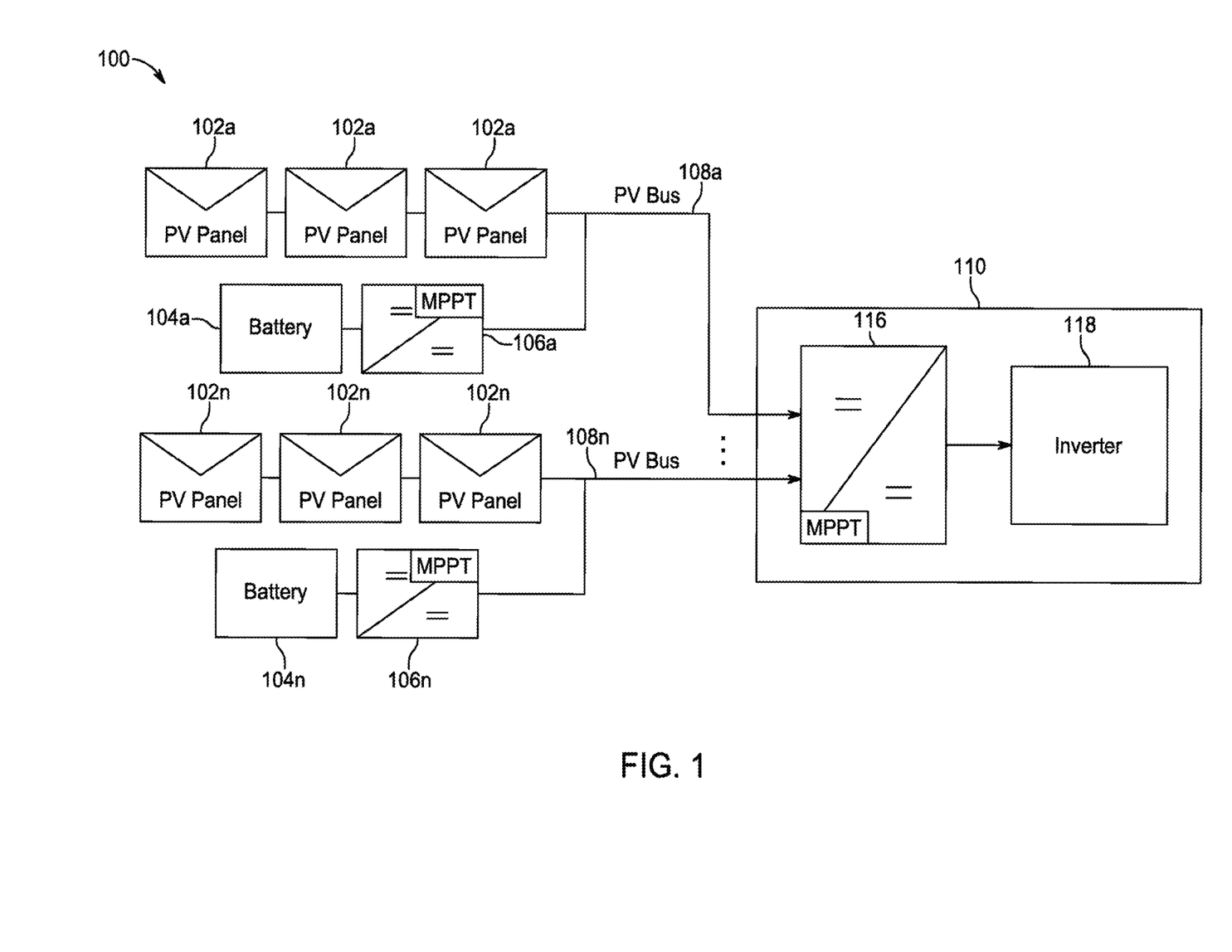
FIG. 1 is a schematic diagram illustrating a PV bus system.

As illustrated in FIG. 1, utility-scale solar projects include many PV panels 102a-102n connected to a grid-tied central inverter unit 110 that is equipped with integrated Maximum Power Point Tracking (MPPT) functionality. Typically, multiple solar modules (e.g., 30 solar modules) are series-connected to form a PV string and PV strings (e.g., 10-24 PV strings) are parallel-connected at a combiner box (not shown). The combiner box is then connected to the central inverter unit 110. The PV bus system 100 of this disclosure includes sets of PV panels 102a-102n, energy storage devices 104a-104n, and a grid-tied or islanding-capable central inverter unit 110.

The sets of PV panels 102a-102n are connected to common fixed DC buses 108a-108n, respectively. Unlike a fixed DC bus architecture, distributed MPPT controllers connected to the sets of PV panels 102a-102n may not be utilized in the PV bus system. Instead, MPPT is achieved within either the central inverter unit 110 or the distributed DC/DC controllers 106a-106n, each of which includes a DC/DC converter.

The energy storage devices 104a-104n, which may be vanadium flow batteries or lithium-ion batteries, are connected to the common, fixed DC buses 108a-108n via the battery controllers 106a-106n, respectively. The grid-tied or islanding-capable central inverter unit 110 converts DC electricity to AC electricity. The central inverter unit 110 includes a DC/DC controller 116 implementing MPPT functionality. The DC/DC controller 116 may include a step-up or step-down DC/DC converter. The central inverter unit 110 also includes an inverter 118 connected to the output of the DC/DC controller 116. Alternatively, the DC/DC controller 116 and the inverter 118 may be hybridized into a single unit.

PV Bus Control Methods

As performance and stability issues arise when multiple DC/DC controllers with MPPT functionality simultaneously attempt to track a maximum power point from a common PV bus, it is difficult to integrate energy storage systems into these systems at the bus level. In instances, DC/DC controllers with MPPT functionality relying on voltage perturbation methods, such as the Perturb and Observe and Incremental Conductance MPPT methods, may inadvertently track the maximum power point based on the voltage perturbations of neighboring DC/DC controllers with MPPT functionality, resulting in poor performance and/or system instability. To address this issue, several novel distributed multiagent maximum power tracking methods that can operate with low-bandwidth or no-bandwidth communications may be used with the PV bus system 100.

Control Mode Hand-Off

Figure 2:
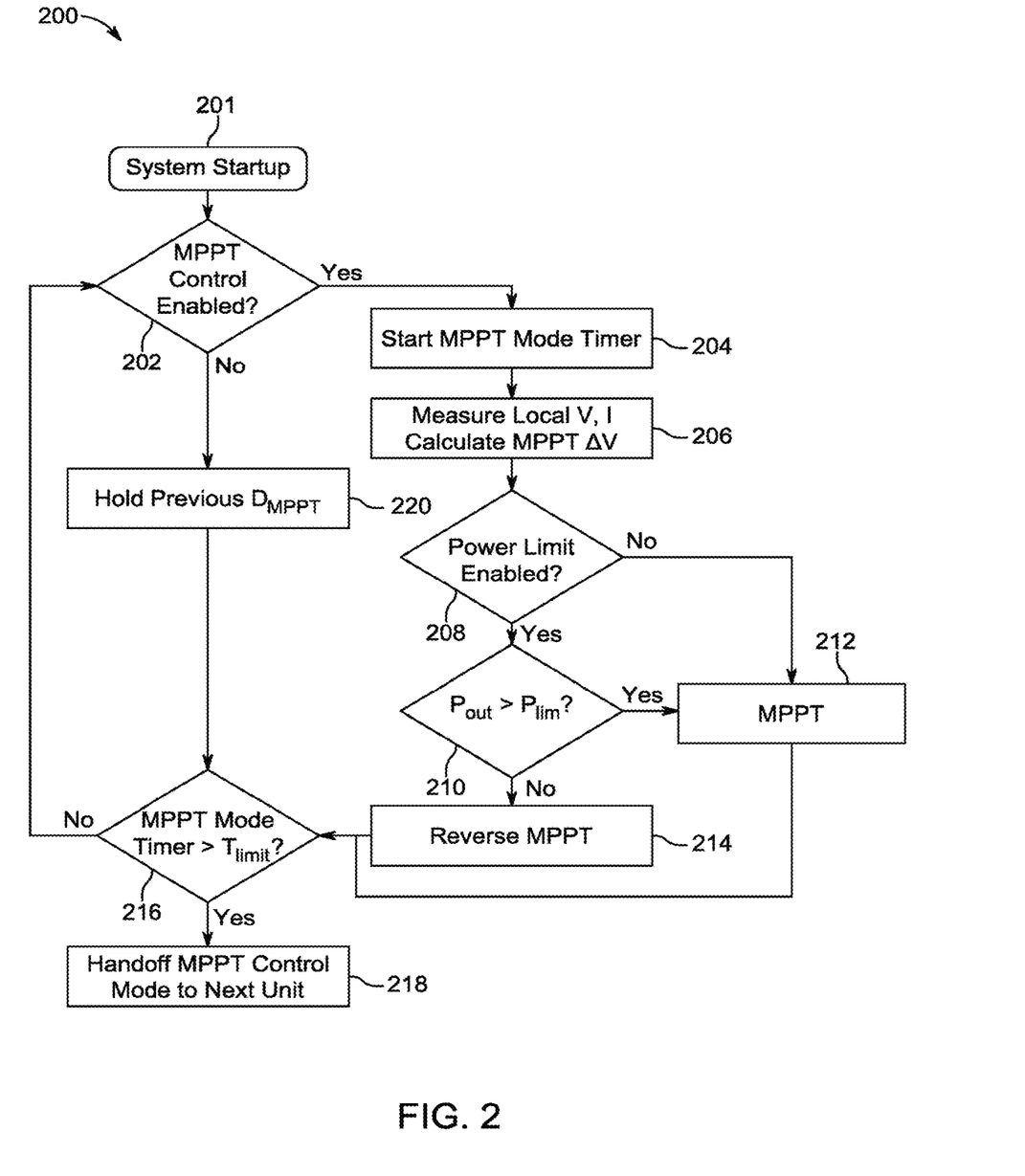
FIG. 2 is a flowchart illustrating MPPT control mode handoff for PV bus systems.

Control mode handoff is a distributed MPPT method that designates one of the DC/DC controllers 106a-106n as a PV bus agent with exclusive MPPT control privileges. The MPPT control privilege is "handed-off" to a neighboring DC/DC controller with MPPT functionality after a prespecified duration, e.g., 5-15 seconds, or if certain operating conditions are met, such as a hand off to the DC/DC controller 106a-106n associated with the battery or battery bank 104a-104n with the lowest state of charge. The DC/DC controllers not currently operating in MPPT mode operate instead with a fixed duty cycle. The duty cycle ratio may be set at each DC/DC controller's 106a-106n last known MPPT setpoint. FIG. 2 is a flowchart illustrating an example of a method 200 for control mode handoff.

At block 201, the PV bus system initiates startup. At block 202, the method 200 includes determining at the current DC/DC controller whether MPPT control is enabled. If MPPT control is enabled, an MPPT mode timer, which may also be referred to as an MPPT mode handoff timer or MPPT mode transition timer, is started at block 204. Then, at block 206, the local voltage and current, e.g., the voltage and current at the output of the PV string, are measured and the maximum power point voltage seeking direction $\Delta V$ is calculated based on the measured local power perturbations.

At block 208, the method 200 includes determining whether the power limit is enabled. If the power limit is enabled, the method includes determining whether the output power is greater than the power limit at block 210. Block 210 may include determining the output power based on the measured local voltage and current. If the output power is greater than the power limit, MPPT is performed in the direction of negative $\Delta V$ at block 212. If the output power is not greater than the power limit, MPPT is performed in the direction of positive $\Delta V$ (which is also referred to herein as reverse MPPT) at block 214. If the power limit is determined not to be enabled at block 208, MPPT is performed at block 212.

After MPPT is performed at block 212 or after reverse MPPT is performed at block 214, the method 200 includes determining whether the MPPT mode timer is greater than a time limit. If the MPPT mode timer is determined to be greater than a time limit, the MPPT control mode is handed off to the next unit at block 218. If the MPPT mode timer is not greater than the time limit at block 216, the method 200 returns to block 202 to determine whether MPPT control is enabled. If MPPT control is not enabled, the previous duty cycle at the current unit's last known MPPT setpoint is held. Then, the method 200 repeats block 216, determining whether the MPPT mode timer is greater than the time limit.

Sequential MPPT Control

Sequential MPPT control is a modification of control mode handoff in which each distributed energy resource (DER) unit is allowed a single voltage perturbation before passing the MPPT control privilege to the next DC/DC controller.

Adaptive $\Delta V$ MPPT Control

Adaptive $\Delta V$ MPPT control operates by scaling the magnitude of the voltage or power perturbation based on a local device metric, such as current device power output or battery state of charge. In this mode, no communications between DC/DC controllers may be needed.

Power Limiting Control

Power export curtailment may be achieved with by applying a small modification to the underlying MPPT method while using the control mode handoff and adaptive $\Delta V$ techniques. This modification involves reversing the direction of a MPPT controller duty cycle adjustment during the voltage perturbation step when power export exceeds set limits Power limiting control applied to the Perturb and Observe and Incremental Conductance methods are similar.

Fixed DC Bus Power Systems

Figure 3:
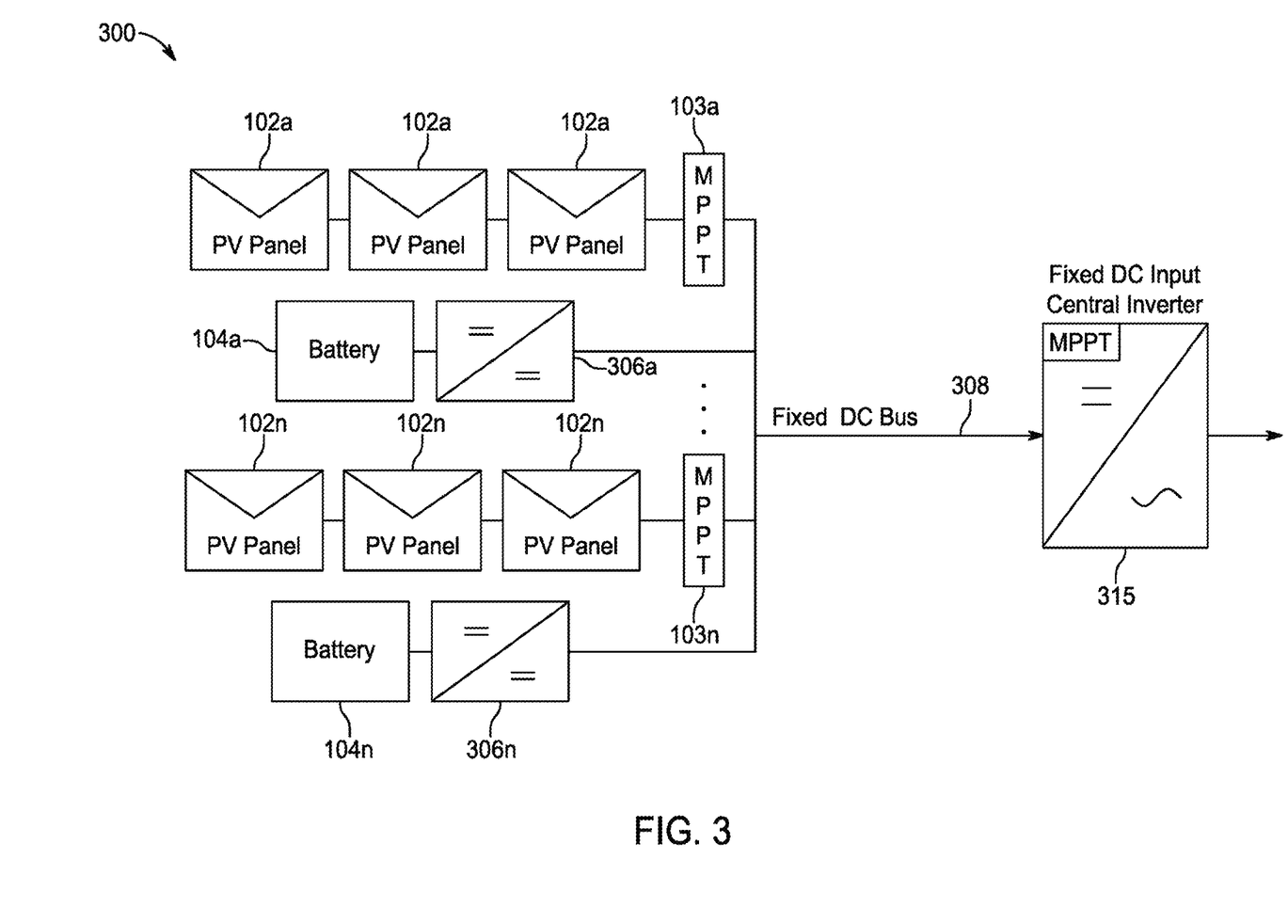
FIG. 3 is a schematic diagram illustrating a fixed DC bus system architecture according to one aspect of this disclosure.

The fixed DC bus power system 300 utilizes a single, fixed DC bus 308 to transfer power among all connected devices. MPPT and voltage matching may be provided by string-level MPPT controllers 103a-103n and a central inverter 310 with MPPT functionality. Multiple wiring runs to the central inverter 310 may be eliminated.

The fixed DC bus power system 300 includes sets of PV panels 102a-102n, energy storage devices 104a-104n, DC/DC controllers 306a-306n, which include DC/DC converters, and a grid-tied and/or islanding-capable central inverter unit 310. The sets of PV panels 102a-102n are coupled to a common fixed DC bus 308 via distributed MPPT controllers 103a-103n. Each MPPT controller 103a-103n is coupled between a respective PV panel 102a-102n and the common fixed DC bus 308. The energy storage devices 104a-104n, which may be vanadium flow or lithium-ion batteries, are connected to the common, fixed DC bus 308 via bidirectional DC/DC battery controllers 106a-106n, respectively. The grid-tied and/or islanding-capable central inverter unit 310 converts DC electricity to AC electricity and is capable of operating with a fixed DC input.

Fixed DC Bus Control Methods

The availability of a common voltage standard across all devices simplifies control design for fixed DC bus power systems 300. Power sharing, power export limiting, and battery charge/discharge can be achieved by operating individual devices, e.g., the MPPT controllers 103a-103n, in voltage/power droop mode, current limiting mode, and current tracking modes, respectively. DC bus voltage stability may be ensured by limiting voltage tracking to a single device per fixed DC bus system by utilizing power/voltage droop control methods. Voltage regulation may be assigned to either the central inverter 315 for maximum utility power export with limited battery charge/discharge, or the battery system for curtailed power grid power export with maximum battery charging. Voltage regulation assignment may be achieved via the same low bandwidth communications pathways as used in PV bus control mode handoff. Table 1 illustrates PV MPPT, inverter, and battery control modes during various system operation modes for PV bus and fixed DC bus power systems.

TABLE 1

Example PV Bus and Fixed DC Bus Device Control Modes.

| | PV Bus | | | Fixed DC Bus | | |
|---|---|---|---|---|---|---|
| | MPPT | Power Export Limiting | Power Limiting with Battery MPPT | MPPT | Power Export Limiting | Power Limiting with Battery MPPT |
| Central Inverter | MPPT[1] | Power Limiting MPPT[1] | Power Limiting MPPT[1] | Voltage Regulation | Power Tracking[2] | Power Tracking |
| $D_{MPPT}$ | N/A | N/A | N/A | MPPT | MPPT | MPPT |
| Battery | Power Limiting MPPT[1] | Power Limiting MPPT[1] | MPPT[1] | Power Tracking | Power Tracking[2] | Voltage Regulation |

[1]Control Handoff Enabled.
[2]Voltage/Power Droop Enabled.

Simulation

Figure 4:
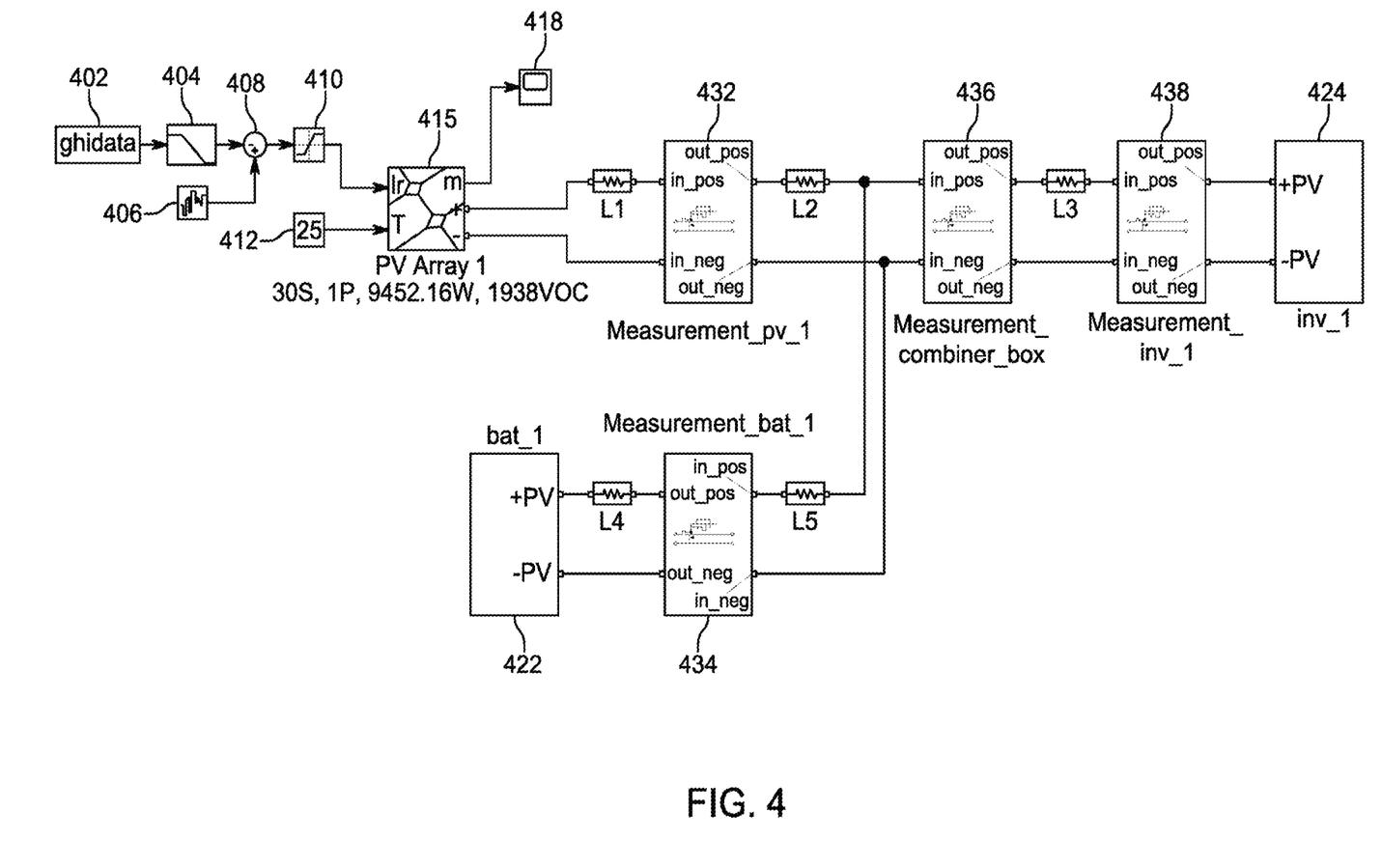
FIG. 4 is a schematic diagram illustrating a PV bus model.
Figure 5:
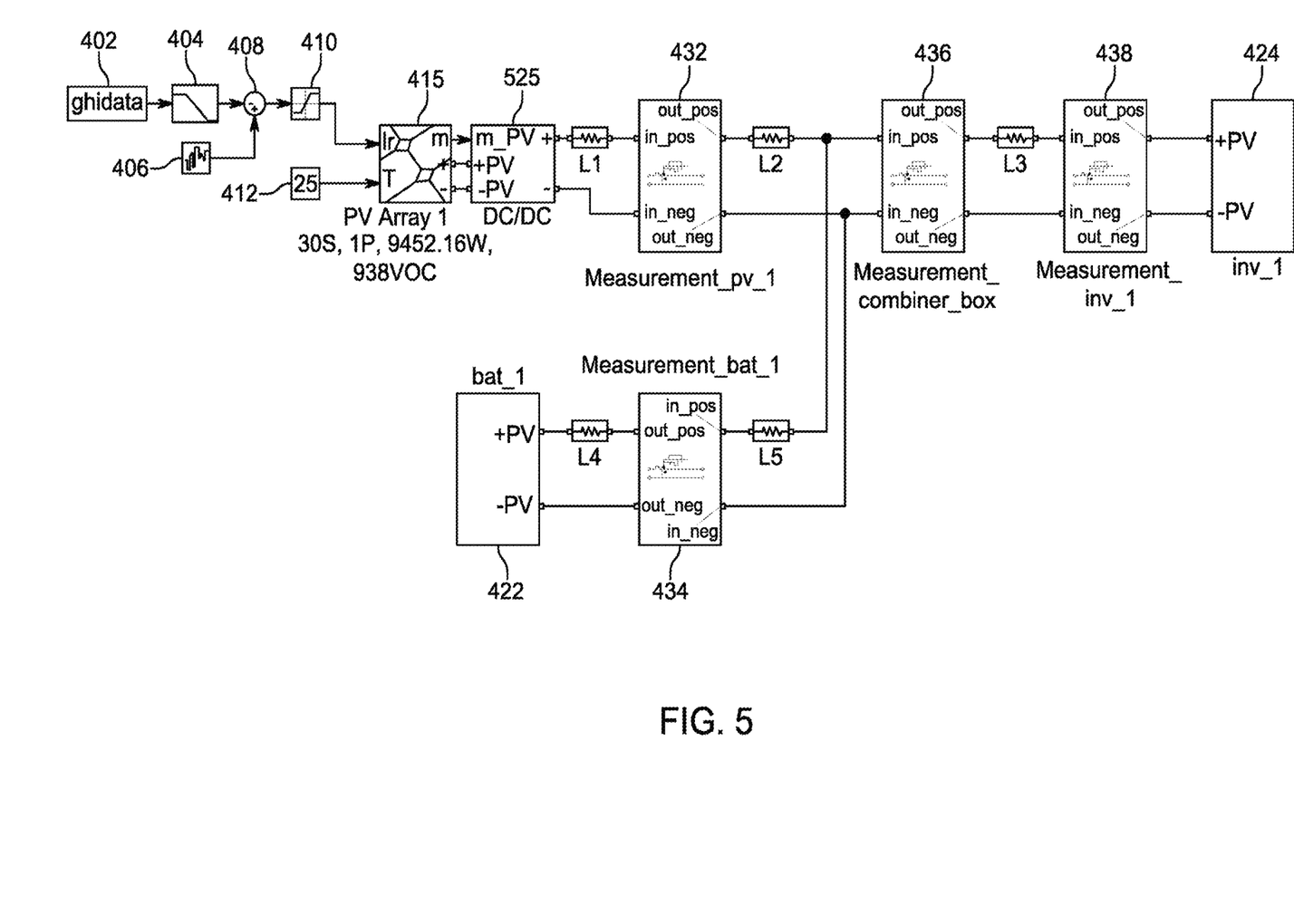
FIG. 5 is a schematic diagram illustrating a fixed DC bus model.

The above control methods may be implemented and applied to 3:2:1 and 1.6:0.6:1 (PV:Battery:AC) PV bus and fixed DC bus power system models. FIGS. 4 and 5 show examples of models for the PV bus and fixed DC bus systems, respectively. In the models, solar data 402 is filtered by a low-pass filter 404 and random noise 406 is added to the filtered solar data via an addition block 408. The processed solar data, e.g., the irradiance applied to the PV panels, is then applied to the input of a PV array model 415 via a saturation limit block 410. A temperature is also applied to the input of the PV array model 415 via a temperature model block 412.

In the PV bus system model of FIG. 4, the measurement block 432 measures the voltage output from the PV array model 415. In the fixed DC bus system model of FIG. 5, the measurement block 432 measures the voltage output from the MPPT controller 525, which is coupled to the outputs of the PV array model 415. The measurement block 434 measures the voltage of the battery 422, the measurement block 436 measures the voltage at the location of the combiner box, and the measurement block 438 measures the voltage at the inverter 424. The PV bus system model also includes a display block 418 coupled to the measurement output of the PV array model 415. The display block 418 may display one or more measurements relating to the PV array model 415, e.g., voltage and current.

Results

Simulation results are presented below comparing PV bus power systems and fixed DC bus systems. The above PV bus control methods may be utilized to provide PV bus power system functionally similar to that inherent in the fixed DC bus power system.

MPPT Tracking Time

Figure 6:
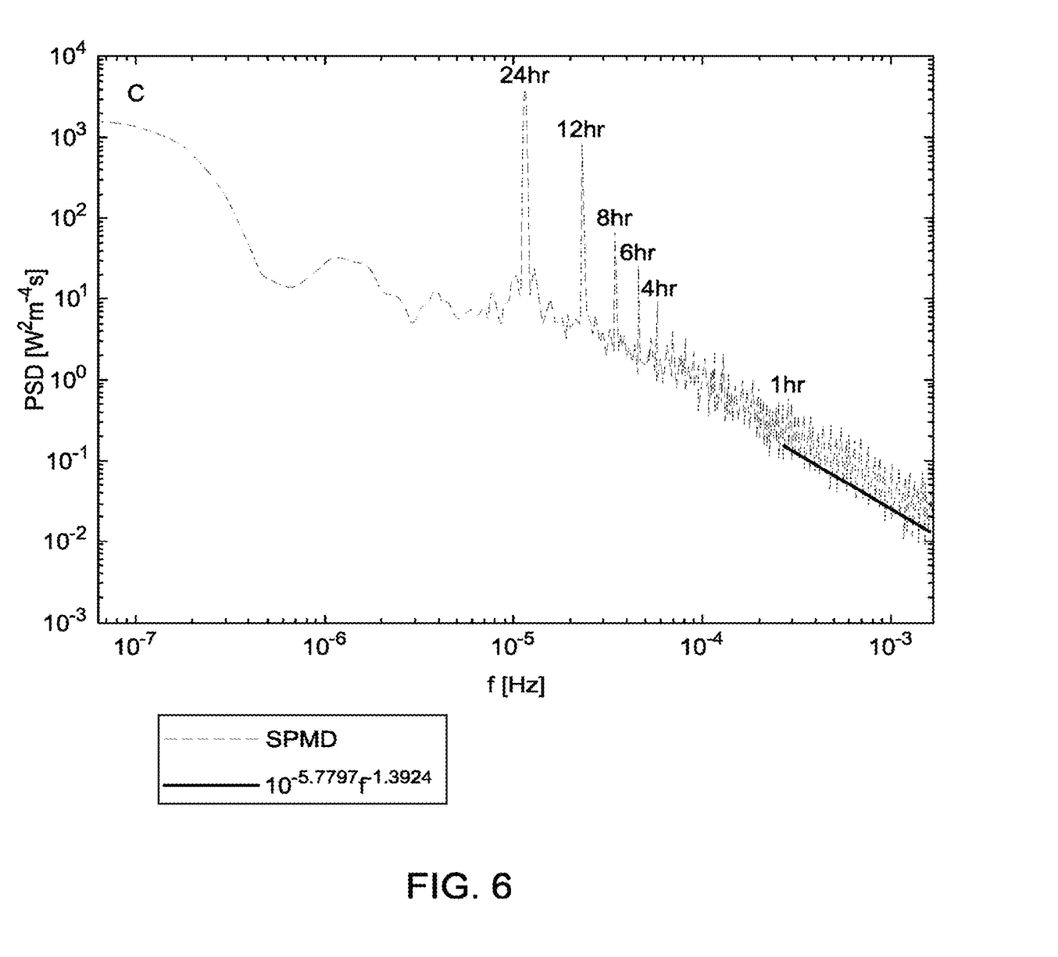
FIG. 6 is a graphical diagram illustrating solar variability spectra, which may be used to determine the rate at which MPPT control may be handed off between two MPPT units of a network of MPPT units.

The time tracking settings of centralized and distributed MPPT may not have a significant impact on performance when applied to typical solar insolation profiles. A survey of various MPPT methods, shown in Table 2 below, suggests that the tracking time of current MPPT methods may be sufficient to account for typical temporal variations in insolation. Compared to the frequency of variations in solar as illustrated in FIG. 6 by the power spectral density of solar data, current MPPT tracking speeds are adequate to track the majority of temporal insolation variations and a time-accelerated direct normal irradiance (DNI) profile is used in all simulations.

TABLE 2

Example Tracking Time Comparison of Various MPPT Methods.

| Example Tracking Methods | Example Tracking Times (seconds) |
|---|---|
| Differential Particle Swarm Optimization | 0.5 |
| Fill Factor | 1.96 |
| Modified Fill Factor | 1.2 |
| Conventional Perturb and Observe | 0.2 |
| Drift-free Perturb and Observe | 0.15 |
| Hybrid Ant Colony Optimization/P&O | 2.41 |
| Particle Swarm Optimization | 12.41 |
| Ant Colony Optimization | 9.47 |

PV Bus Control Mode Handoff Performance

Figure 7:
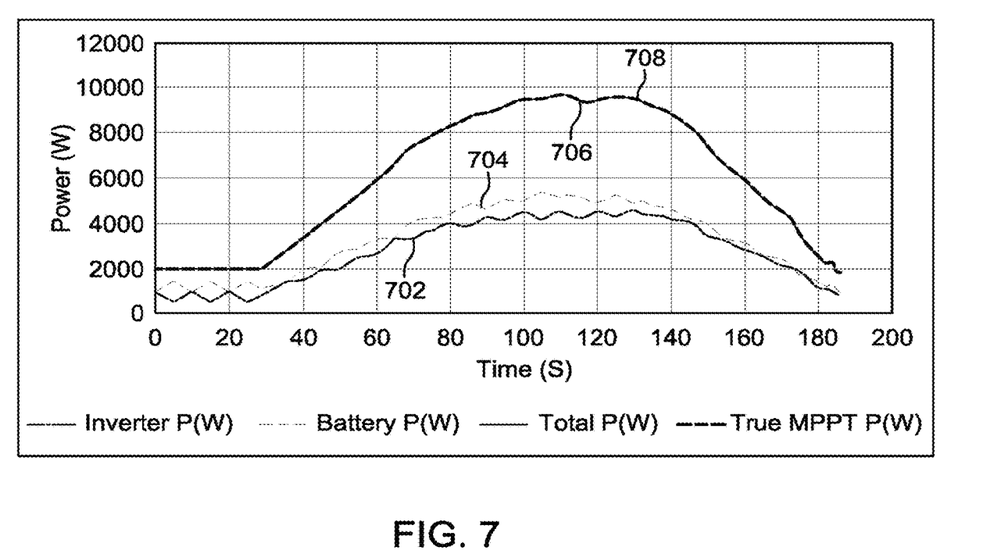
FIG. 7 is a graphical diagram illustrating PV bus MPPT performance.

PV bus MPPT tracking and power export limiting performance achieved with control mode handoff may be evaluated by simulating an accelerated-time insolation profile with a PV+battery PV bus system. A digital twin PV observer model with true MPPT may also be simulated to provide a performance baseline. Results for control mode handoff with MPPT are shown in FIG. 7. As shown in FIG. 7, the inverter power 702 and the battery power 704 increase from about 1000 W to about 5000 W and then decrease back to about 1000 W. The total power curve 706 tracks the MPPT power curve 708. In this simulation, power sharing is unforced and is automatically determined by the ratio of the line impedances between the batteries and central inverter and the PV bus, but can be altered via the introduction of a power-voltage droop bias using, for example, the controller of FIG. 12, which incorporates a droop stage. The total energy extracted from the PV panel matches baseline performance.

Figure 8:
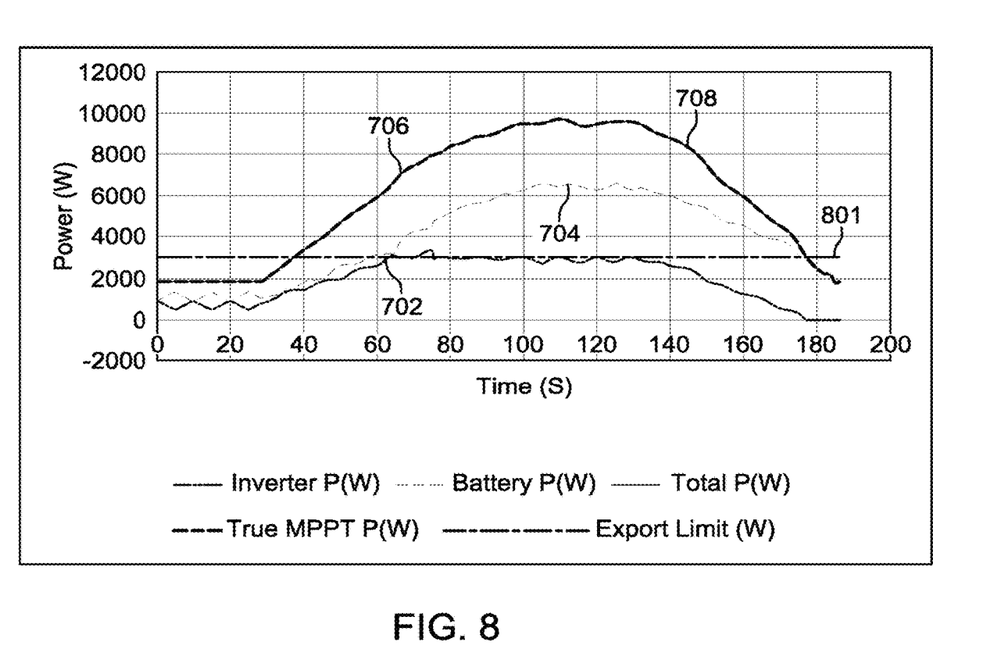
FIG. 8 is a graphical diagram illustrating PV bus MPPT and power export limiting performance.

Results using control mode handoff with MPPT and a 3000 W inverter power export limit are shown in FIG. 8. As shown in FIG. 8, the battery power 704 increases from about 1000 W to over 6000 W and then decreases down to the power export limit 801; the inverter power 702 increases from about 1000 W, is limited to the power export limit 801, and then decrease to 0 W; and the total power curve 706 tracks the MPPT power curve 708. In this case, active PV bus devices operate in unforced power sharing mode, which is the system operating in static duty cycle mode and which may correspond to the state 220 of FIG. 2, similar to the scenario in FIG. 7. When a power export limit is reached, e.g., the power export limit 801 illustrated in FIG. 8, the central inverter switches to reverse MPPT control to maintain a fixed power output and the battery absorbs the excess PV power. Control mode handoff may automatically adjust the power sharing ratios to extract maximum PV energy while limiting central inverter power export.

In both scenarios, overall system MPPT is comparable to baseline performance and power export tracking performs as expected. Slight tracking overshoot/undershoot is shown, but this is attributed to the aggressive simulation time acceleration factor and large ΔV. Improved performance is expected with real-time conditions and smaller voltage perturbation steps.

Fixed DC Bus Performance

Figure 9:
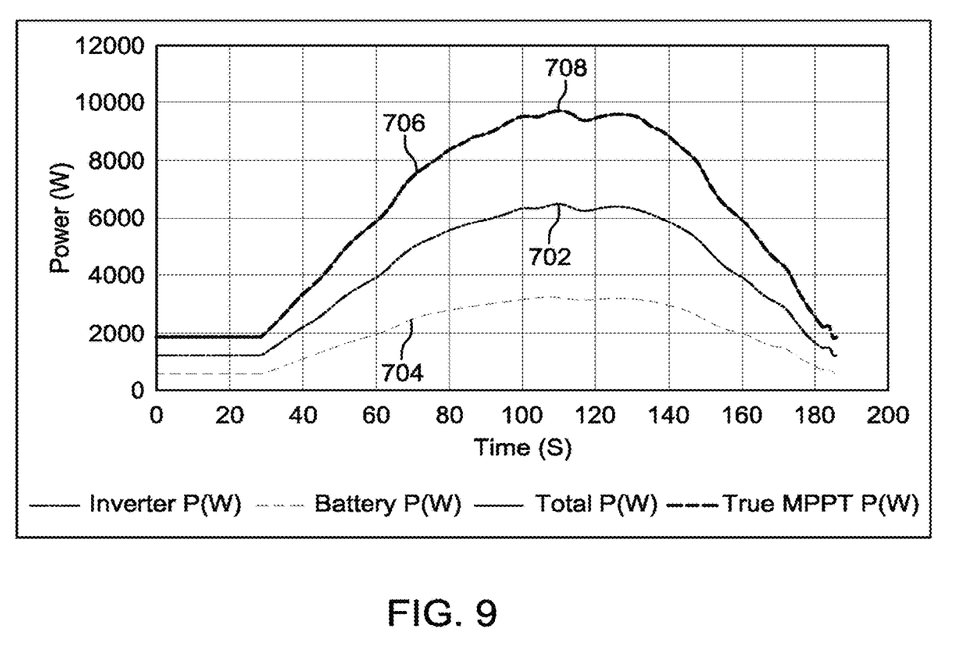
FIG. 9 is a graphical diagram illustrating fixed DC bus MPPT and voltage droop power sharing performance.
Figure 10:
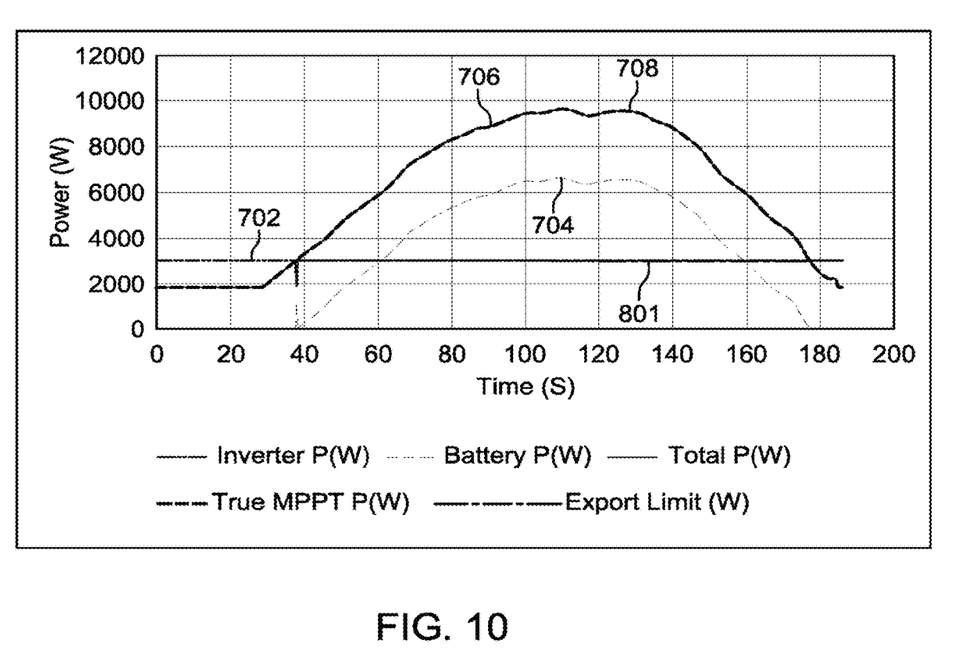
FIG. 10 is a graphical diagram illustrating fixed DC bus power export limiting with MPPT performance.

Fixed DC bus MPPT power sharing and MPPT power sharing with inverter power export limit results are shown in FIGS. 9 and 10. In the non-export limiting case relating to the results illustrated in FIG. 9, an inverter-to-battery droop ratio of 2:1 is established to demonstrate controlled power sharing. As illustrated in FIG. 9, the battery power 704 increases from about 700 W to over 3000 W and then decreases back to about 700 W; the inverter power 702 increases from about 1300 W to over 6000 W and then decrease back to about 1300 W; and the total power curve 706 tracks the MPPT power curve 708.

Figure 11:
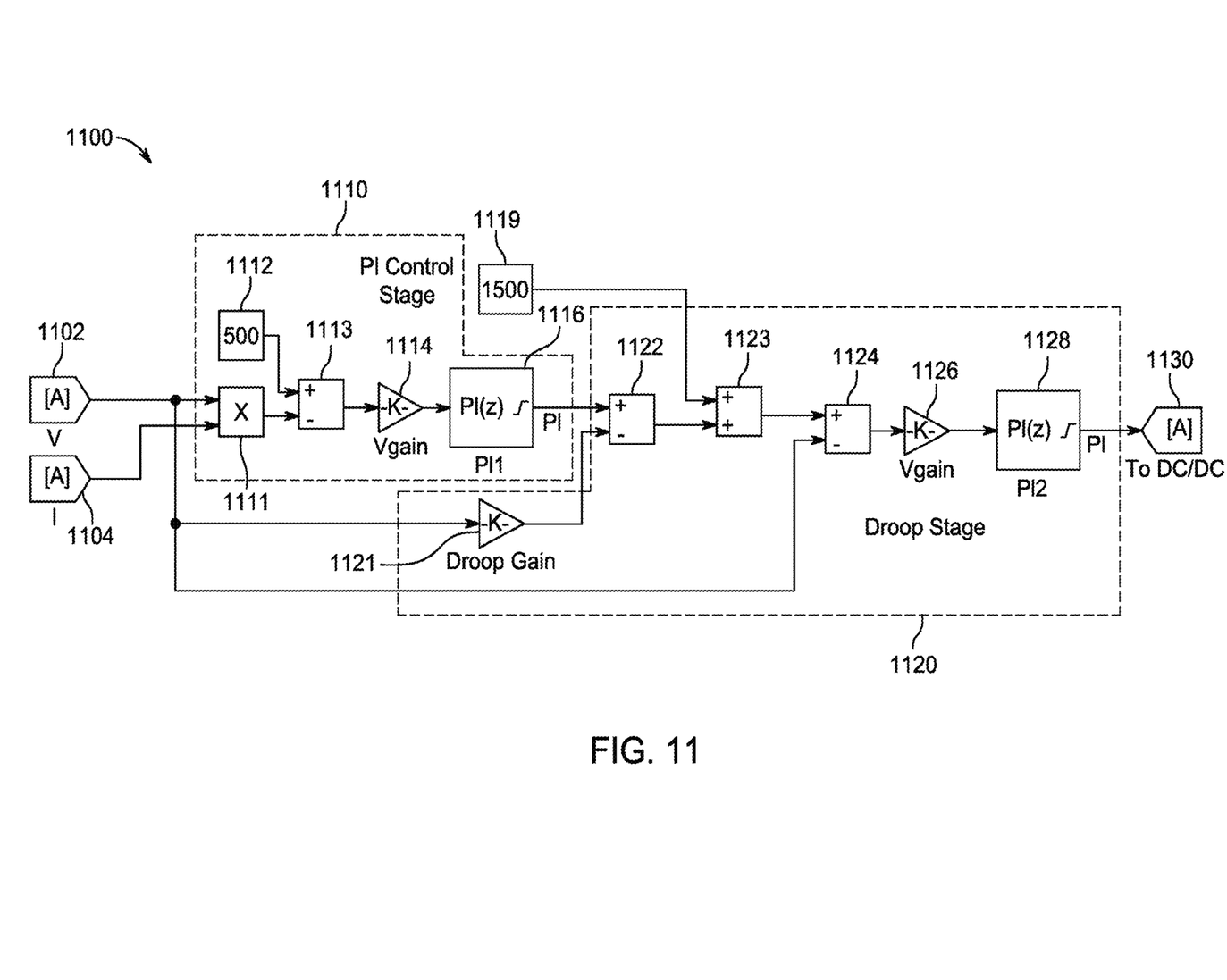
FIG. 11 is a schematic diagram illustrating a hybrid power limiting droop controller.

In the power limiting case relating to the results illustrated in FIG. 10, a 3000 W power export limit is imposed. As shown in FIG. 10, the battery power 704 increases from 0 W to over 6000 W and then decreases back to 0 W; the inverter power 702 primarily tracks the 3000 W power export limit; and the total power curve 706 tracks the MPPT power curve 708. A hybrid power droop/power limiting controller, which allows seamless and automatic transition between droop control and power limiting, may be applied within any bus-connected component. In aspects, the hybrid power droop/power limiting controller may be incorporated into the central inverter units, the inverters, the MPPT controllers, and/or the DC/DC controllers of this disclosure. An example of a hybrid power droop/power limiting controller 1100 is illustrated in FIG. 11. The hybrid power droop/power limiting controller 1100 includes a proportional-integral (PI) control stage 1110 and a droop stage 1120. Alternatively, the PI control stage 1110 may be replaced by a proportional-integral-derivative (PID) control stage. The derivative gain of the PID control stage may be set to zero.

The hybrid power droop/power limiting controller 1100 includes a voltage input terminal 1102 and a current input terminal 1104, which are applied to a multiplication block 1111, which determines the product of a voltage value applied to the voltage input terminal 1102 and a current value applied to the current input terminal 1104, and outputs the resulting power value. The power value may be subtracted from a bias value output from a bias block 1112 using a subtraction block 1113. The output from the subtraction block 1113 is applied to a voltage gain block 1114. The output from the voltage gain block 1114 is applied to a digital proportional-integral (PI) block 1116. The voltage input 1102 is also applied to a droop gain block 1121.

The output from the droop gain block 1121 is then subtracted from the output of the digital proportional-integral block 1116 by subtraction block 1122. The output from the subtraction block 1122 is added to an offset value, e.g., 1500, output from an offset block 1119 by an addition block 1123. The voltage input 1102 is then subtracted from the output of the addition block 1123 by subtraction block 1124, the output of which is applied to voltage gain block 1126. The output from the voltage gain block 1126 is then applied to digital PI block 1128, which applies a PI control to the output from the voltage gain block 1126. The output of the digital PI block 1128 is then provided to a DC/DC converter via output terminal 1130.

System level power export limiting may be implemented with the battery operating in an idle state until an inverter export limit is reached, at which point the hybrid controller automatically transitions the DC/DC controllers into voltage regulation mode thereby absorbing excess available PV power.

System Efficiency

Conductor and converter losses for PV bus and fixed DC bus system for a single daily insolation curve with varying Inverter:Battery power capacity ratios are assessed (PV capacity is set at the combined inverter and battery capacity). A table of examples of device and conductor resistance values are presented in Table 3. Switching and other parasitic DC/DC converter losses are omitted.

Figure 12:
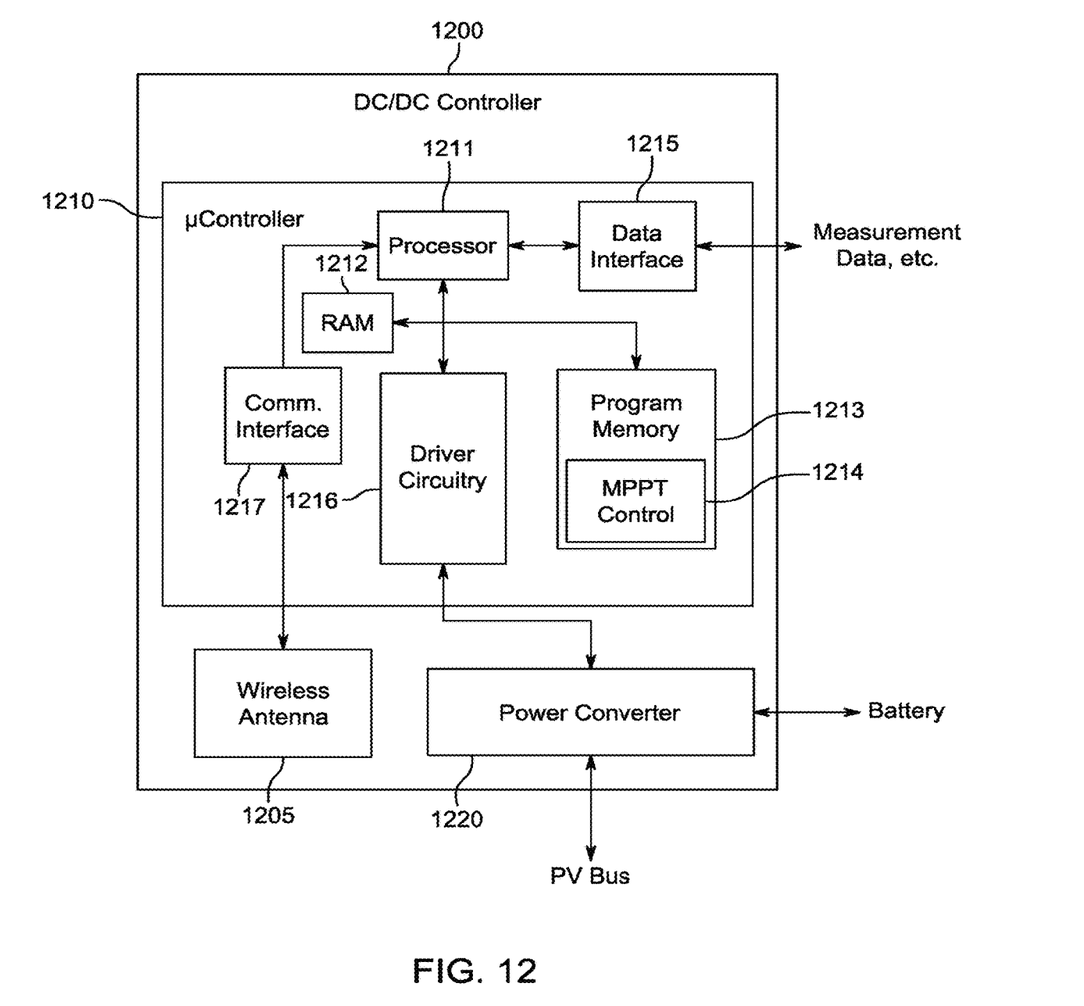
FIG. 12 is a schematic diagram illustrating an example of a DC/DC controller according to this disclosure.

FIG. 12 shows an example of a DC/DC controller 1200, which may implement each of the DC/DC controllers 106a-106n of FIG. 1. Also, the DC/DC controller 1200 or a modified version of the DC/DC controller 1200 may implement the central inverter unit 110, the MPPT controllers 103a-103n of FIG. 3, or the central inverter 315 of FIG. 3. The DC/DC controller 1200 includes a wireless antenna 1205 and a communications interface 1217 configured to communicate with other devices of a power system, e.g., other DC/DC controllers in a PV bus system. The DC/DC controller 1200 also includes a microcontroller 1210 and a power converter 1220. The microcontroller 1210 includes a processor 1211, e.g., a central processing unit (CPU), random access memory (RAM) 1212 coupled to the processor 1211, program memory 1213 coupled to the processor 1211, a data interface 1215 coupled to the processor 1211, driver circuitry 1216 coupled to the processor 1211 and to the power converter 1220, and a communications interface 1217 coupled to the processor 1211.

The data interface 1215 may be coupled to sensors to receive measurement data regarding aspects of the power system. For example, the data interface 1215 may be coupled to a battery fuel gauge, which may measure and/or determine the voltage, current, state of charge, or other information relating to the status of the battery or bank of batteries to which the DC/DC controller 1200 is connected. The program memory may store instructions for an MPPT control method 1214, which may be loaded into RAM 1212 and executed by the processor 1211. In other aspects, the driver circuitry 1216 is incorporated into the power converter 1220 or resides in the DC/DC controller 1200 separate from the microcontroller 1210 and the power converter 1220.

TABLE 3

Example Converter and Conductor Resistance Values

| Example Device/Conductor | Example Average DC Resistance |
|---|---|
| DC Bus-1500 V | |
| Inverter | 0.005 Ω |
| DC Bus MPPT Converter | 0.005 Ω |
| Total PV Series Resistance | 0.485 Ω |
| Battery DC/DC Converter | 0.005 Ω |
| Battery to DC Bus Line Segment | 0.00025 Ω |
| PV to DC Bus Line Segment | 0.00025 Ω |
| Total DC Bus Line Segment | 0.00525 Ω |
| PV Bus (1200-2000 V) | |
| Inverter | 0.005 Ω |
| Total PV Series Resistance | 0.97 Ω |
| Battery DC/DC Converter | 0.005 Ω |
| Battery to PV Bus Line Segment | 0.00025 Ω |
| PV to PV Bus Line Segment | 0.00025 Ω |
| Total PV Bus Line Segment | 0.00525 Ω |

The power converter 1220 may include a DC/DC converter, such as a DC/DC buck converter, that steps down a DC voltage received from a PV string and outputs a lower DC voltage onto a fixed DC bus. In the case of the hybridized central inverter unit 110 of FIG. 1 or the central inverter 315 of FIG. 3, the power converter 1220 may include a DC/AC inverter that converts the DC voltage on the DC bus to AC voltage suitable for feeding the power grid. The DC/AC converter may convert the DC voltage at a DC bus to AC voltage with suitable frequency and voltage magnitude to feed the power grid. The power converter 1220 may be controlled by the microcontroller 1210 via the driver circuitry 1216 to provide both AC power regulation and maximum power extraction. As used herein, "AC power regulation" means regulating the active power or reactive power output from the power converter according to active power or active power command signals, and "maximum power extraction" means dynamically moving the operating point of the solar power source to its highest point on the power curve (which may change in response to environmental changes such as irradiation and temperature changes) to have maximum amount of power output from the PV panels.

In the case of the hybridized central inverter unit 110 or the central inverter 315, the microcontroller 1210 is configured to send control signals to the power converter 1220 to regulate the PV power output from the PV strings according to various command signals and feedback signals. In the case of a hybridized central inverter unit 110 or the central inverter 315, the microcontroller 1210 is configured to send control signals to the power converter 1220 to regulate the active power or reactive power output from the power converter 1220 according to various command signals and feedback signals. The power converter 1220 may include any type of converter topology such as a half bridge converter, a full bridge converter, or a push-pull converter. In the case of a hybridized central inverter unit 110 or the central inverter 315, the power converter 1220 may include any type of DC to AC converter topology such as a two-level converter or a three-level converter. The power converter 1220 may include semiconductor switching devices (not shown), including but not limited to, integrated gate commutated thyristors (IGCTs) and insulated gate bipolar transistors (IGBTs).

Figure 13:
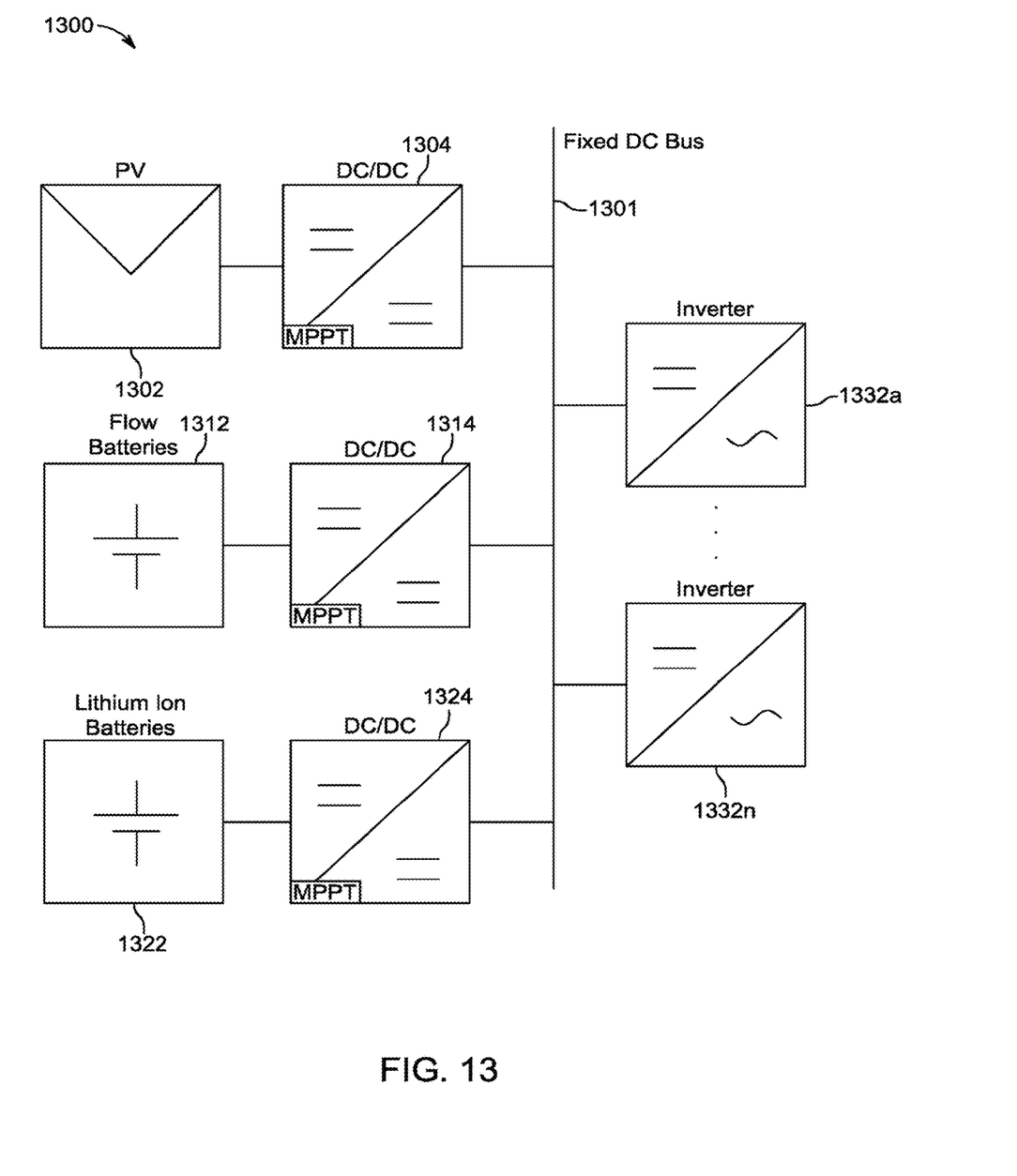
FIG. 13 is a schematic diagram illustrating a fixed DC bus system architecture according to another aspect of this disclosure.

FIG. 13 depicts an example of a fixed DC bus system architecture 1300 according to another aspect of this disclosure. The fixed DC bus system architecture 1300 includes at least one PV panel or PV string 1302, flow batteries 1312, and lithium-ion batteries 1322 electrically coupled to a fixed DC bus 1301 via DC/DC controllers 1304, 1314, 1324, respectively. Each DC/DC controller 1304, 1314, 1324 includes MPPT functionality. The fixed DC bus system architecture 1300 also includes two or more inverters 1332a-1332n coupled to the fixed DC bus 1301. The inverters 1332a-1332n may be configured as modular inverters, which may be selectively added to or removed from the fixed DC bus system architecture 1300 so that the fixed DC bus system architecture 1300 can be expanded or contracted as needed.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, PV panels, PV strings, or batteries.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, read-only memory (ROM), electrically erasable programmable read-only memory (EEPROM), flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A method comprising:
   determining, at a current DC/DC controller, that a maximum power point tracking (MPPT) control is enabled;
   in response to determining that the MPPT control is enabled, allowing a single voltage perturbation for a distributed energy resource connected to the current DC/DC controller; and
   handing off MPPT control mode to a next DC/DC controller.

2. The method of claim 1, further comprising scaling the magnitude of the voltage perturbation based on a local device metric.

3. The method of claim 1, wherein the local device metric is based on an output power.

4. The method of claim 1, wherein the local device metric is based on a battery state of charge.

5. The method of claim 1, further comprising:
   in response to determining that the MPPT control is enabled, starting an MPPT mode timer; and
   handing off MPPT control mode to the next DC/DC controller after the single voltage perturbation and in response to determining the MPPT mode timer exceeds a predetermined period.

6. The method of claim 5, further comprising:
   determining that the MPPT mode timer is not greater than the predetermined period;
   in response to determining that the MPPT mode timer is not greater than the predetermined period, further determining that the MPPT control is enabled; and
   in response to further determining that the MPPT control is enabled, starting the MPPT mode timer.

7. The method of claim 1, further comprising:
   determining that the MPPT control is not enabled; and
   in response to determining that the MPPT control is not enabled, holding a previous duty cycle at the current DC/DC controller's last known MPPT setpoint.

8. The method of claim 1, further comprising:
measuring local voltage and current; and
determining MPPT ΔV based on the local voltage.

9. The method of claim 8, further comprising:
determining that a power limit is enabled; and
in response to determining that the power limit is enabled:
  determining output power based on the local voltage and current; and
  determining that the output power is greater than a power threshold; and
in response to determining that the output power is greater than the power threshold, performing MPPT.

10. The method of claim 9, further comprising:
determining that the output power is not greater than a power threshold; and
in response to determining that the output power is not greater than the power threshold, performing reverse MPPT.

11. A PV bus system, comprising:
a central inverter unit;
a plurality of PV buses coupled to the central inverter unit;
a plurality of PV strings coupled to the central inverter unit via the plurality of PV buses, respectively;
a plurality of batteries coupled to the plurality of PV buses, respectively; and
a plurality of DC/DC controllers coupled between the plurality of batteries and the plurality of PV buses, respectively, each of the plurality of DC/DC controllers comprising:
  a processor; and
  a memory having stored thereon instructions, which, when executed by the processor, cause a DC/DC controller to:
    determine that a local maximum power point tracking (MPPT) control is enabled;
    in response to determining that the local MPPT control is enabled, allowing a single voltage perturbation for a distributed energy resource connected to the DC/DC controller; and
    handing off MPPT control mode to a next DC/DC controller.

12. The PV bus system of claim 11, wherein each DC/DC controller of the plurality of DC/DC controllers includes an MPPT controller and a DC/DC converter, and wherein each of the plurality of PV strings includes at least one PV panel.

13. The PV bus system of claim 11, wherein the instructions, when executed by the processor, further cause the DC/DC controller to:
determine that the MPPT control is not enabled; and
in response to determining that the MPPT control is not enabled, hold a previous duty cycle at the current DC/DC controller's last known MPPT setpoint.

14. The PV bus system of claim 11, wherein the instructions, when executed by the processor, further cause the DC/DC controller to:
measure local voltage and current;
determine MPPT ΔV based on the measured local voltage;
determine that a power limit is enabled; and
in response to determining that the power limit is enabled:
  determine output power based on the measured local voltage and current; and
  determine that the output power is greater than a power threshold; and
in response to determining that the output power is greater than the power threshold, perform MPPT.

15. The PV bus system of claim 11, wherein the instructions, when executed by the processor, further cause the DC/DC controller to:
determine that output power is not greater than a power threshold; and
in response to determining that the output power is not greater than the power threshold, perform reverse MPPT.

16. A method comprising:
determining, at a current DC/DC controller, that a maximum power point tracking (MPPT) control is enabled;
in response to determining MPPT control is enabled:
  determining that a power threshold is enabled;
  measuring a local voltage and local current at the current DC/DC controller;
  determining output power is greater than the power threshold based on the measured local voltage and local current;
  in response to determining that the output power is greater than the power threshold, performing MPPT; and
  handing off MPPT control to a next DC/DC controller.

17. The method of claim 16, further comprising determining MPPT ΔV based on the measured local voltage.

18. The method of claim 16, further comprising:
determining that the output power is not greater than the power threshold; and
in response to determining that the output power is not greater than the power threshold, performing reverse MPPT.

19. The method of claim 16, further comprising:
in response to determining that the local MPPT control is enabled, starting an MPPT mode timer;
determining the MPPT mode timer exceeds a predetermined threshold; and
handing off MPPT control to the next DC/DC controller after performing MPPT and in response to determining the MPPT mode timer exceeds the predetermined threshold.

20. The method of claim 16, further comprising:
determining that the MPPT control is not enabled; and
in response to determining that the MPPT control is not enabled, holding a previous duty cycle at the current DC/DC controller's last known MPPT setpoint.

* * * * *